(12) United States Patent
Ichimaru et al.

(10) Patent No.: US 12,271,175 B2
(45) Date of Patent: Apr. 8, 2025

(54) TOOL INFORMATION SETTING DEVICE AND MACHINE TOOL

(71) Applicants: CITIZEN WATCH CO., LTD., Tokyo (JP); CITIZEN MACHINERY CO., LTD., Nagano (JP)

(72) Inventors: Daisuke Ichimaru, Higashimurayama (JP); Shohgo Kimura, Sayama (JP); Erisha Hayashi, Kawagoe (JP)

(73) Assignees: CITIZEN WATCH CO., LTD., Tokyo (JP); CITIZEN MACHINERY CO., LTD., Nagano (JP)

( * ) Notice: Subject to any disclaimer, the term of this patent is extended or adjusted under 35 U.S.C. 154(b) by 659 days.

(21) Appl. No.: 17/629,745

(22) PCT Filed: Jul. 15, 2020

(86) PCT No.: PCT/JP2020/027439
§ 371 (c)(1),
(2) Date: Jan. 24, 2022

(87) PCT Pub. No.: WO2021/015064
PCT Pub. Date: Jan. 28, 2021

(65) Prior Publication Data
US 2022/0253036 A1    Aug. 11, 2022

(30) Foreign Application Priority Data

Jul. 25, 2019    (JP) .................. 2019-136800

(51) Int. Cl.
*G05B 19/409*    (2006.01)

(52) U.S. Cl.
CPC .. *G05B 19/409* (2013.01); *G05B 2219/32398* (2013.01)

(58) Field of Classification Search
CPC ........ G05B 19/409; G05B 2219/32398; G05B 2219/36348; G05B 2219/36354;
(Continued)

(56) References Cited

U.S. PATENT DOCUMENTS

| 2005/0022478 A1* | 2/2005 | Zalkin ............... B67B 3/261 53/334 |
| 2005/0038624 A1 | 2/2005 | Simakov et al. |

(Continued)

FOREIGN PATENT DOCUMENTS

| CN | 1675024 A | 9/2005 |
| CN | 1737716 A | 2/2006 |

(Continued)

OTHER PUBLICATIONS

Office Action in Taiwanese Application No. 109124720 mailed Oct. 26, 2023 in 34 pages.
(Continued)

*Primary Examiner* — Santosh R Poudel
(74) *Attorney, Agent, or Firm* — Knobbe Martens Olson & Bear LLP (57) ABSTRACT

A tool information setting device includes: a first storage portion in which a tool holder number and a torque limiting value of tool information, which are associated with each other, are stored; a second storage portion in which a turret face number and a tool holder number, which are associated with each other, are stored; and a torque limiting value setting portion as a tool information setting portion that acquires the tool holder number from the second storage portion based on the turret face number described in the machining program. The torque limiting value setting portion acquires a torque limiting value from the first storage portion based on the acquired tool holder number when (Continued)

selecting a predetermined tool by the turret face number of the turret on which the predetermined tool is mounted.

15 Claims, 9 Drawing Sheets

(58) Field of Classification Search
CPC .............. G05B 19/40938; G05B 19/19; G05B 2219/35349; G05B 19/18
See application file for complete search history.

(56) References Cited

U.S. PATENT DOCUMENTS

| | | | |
|---|---|---|---|
| 2005/0262976 A1 | 12/2005 | Shibui | |
| 2012/0173226 A1* | 7/2012 | McEvoy | G06F 16/221 707/802 |
| 2013/0054568 A1* | 2/2013 | Chen | G06F 16/24542 707/718 |
| 2015/0253759 A1* | 9/2015 | Nagato | B23Q 17/0952 700/175 |
| 2016/0048121 A1* | 2/2016 | Shinohara | G05B 19/404 700/179 |
| 2016/0187871 A1 | 6/2016 | Yi et al. | |
| 2018/0329951 A1* | 11/2018 | Yu | G06N 20/00 |

FOREIGN PATENT DOCUMENTS

| | | |
|---|---|---|
| CN | 104781039 A | 7/2015 |
| CN | 105103065 A | 11/2015 |
| JP | H06-004549 A | 1/1994 |
| JP | 07-009301 A | 1/1995 |
| JP | 09-179620 A | 7/1997 |
| JP | 10-058279 A | 3/1998 |
| JP | H11-296217 A | 10/1999 |
| JP | 2000-141164 A | 5/2000 |
| JP | 2001-255914 A | 9/2001 |
| JP | 2016-132057 A | 7/2016 |
| JP | 6254153 B | 12/2017 |
| JP | 2018158432 A * | 10/2018 |
| TW | 2004/16507 A | 9/2004 |
| TW | 2009/16990 A | 4/2009 |
| TW | 2015/08429 A | 3/2015 |
| TW | 201703917 A | 2/2017 |
| WO | 2014/168152 A1 | 10/2014 |
| WO | 2016185948 A1 | 11/2016 |
| WO | 2018/173434 A1 | 9/2018 |

OTHER PUBLICATIONS

Office Action in Chinese Application No. 202080051813.7, issued date of Aug. 3, 2023 in 8 pages.
International Search Report for PCT Application No. PCT/JP2020/027439, dated Oct. 6, 2020, in 5 pages.
Second Office Action issued for Chinese Patent Application No. 202080051813.7 dated Feb. 23, 2024 in 15 pages.

* cited by examiner

| FIRST STORAGE PORTION 34 | |
|---|---|
| HOLDER INFORMATION TABLE 34a | |
| HOLDER NUMBER | TORQUE LIMITING VALUE |
| FKL654 | 100% |
| GHP321 | 200% |
| DCC345 | 300% |
| ESS987 | 400% |
| ... | ... |
| ***** | ***% |

| SECOND STORAGE PORTION 35 | |
|---|---|
| MACHINING DATA TABLE 35a | |
| T CODE | HOLDER NUMBER |
| T20 | DCC345 |
| T21 | ESS987 |
| T22 | FKL654 |
| T23 | GHP321 |
| ... | ... |
| T29 | GHP321 |

MACHINING PROGRAM STORAGE 25

T21

TORQUE LIMIT PARAMETER

12345  400

MOTOR CONTROLLER 26

TOOL INFORMATION SETTING DEVICE AND MACHINE TOOL

CROSS-REFERENCE TO RELATED APPLICATION

The present application is a national stage application of PCT Application No. PCT/JP2020/027439, filed on Jul. 15, 2020, which claims priority to Japanese Patent Application No. 2019-136800, filed on Jul. 25, 2019, the disclosure of which is hereby incorporated by reference in its entirety.

TECHNICAL FIELD

This disclosure relates to a tool information setting device and a machine tool.

BACKGROUND ART

A turret tool selection instruction method is conventionally known. For example, JP6254153B discloses a turret tool selection instruction method to select a tool required for predetermined machining based on a turret face number of a turret face when various tools are mounted on respective turret faces provided on a circumference surface of a turret through various tool holders according to machining.

SUMMARY

Each tool holder has predetermined tool information according to a structure, for example. The information includes a torque limiting value when machining with a tool to be mounted. When a tool required for machining is selected by the turret tool selection instruction method, it is necessary to perform the machining with the selected tool based on tool information such as a torque limiting value according to a tool holder on which the tool is mounted.

Accordingly, development in a technique capable of simply and freely selecting a tool according to machining and of simply and appropriately executing machining based on tool information such as a torque limiting value suitable for a selected tool is desired.

The present disclosure provides a tool information setting device for setting tool information of a tool. The tool is mounted on each of a plurality of turret faces provided on a circumference surface of a turret through a tool holder according to machining. The tool information setting device includes a first storage portion in which a tool holder number for distinguishing the tool holder and tool information of the tool mounted on the tool holder are stored, the tool holder number being associated with the tool information; a second storage portion in which a turret face number for distinguishing the turret face and the tool holder number of the tool holder mounted on the turret face are stored, the turret face number being associated with the tool holder number; and a tool information setting portion configured to acquire the tool holder number from the second storage portion based on the turret face number described in a machining program and to acquire the tool information of the tool from the first storage portion based on the acquired tool holder number when selecting a predetermined tool by the turret face number of the turret face on which the predetermined tool is mounted.

DETAILED DESCRIPTION OF EMBODIMENTS

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

First Embodiment

Figure 1:
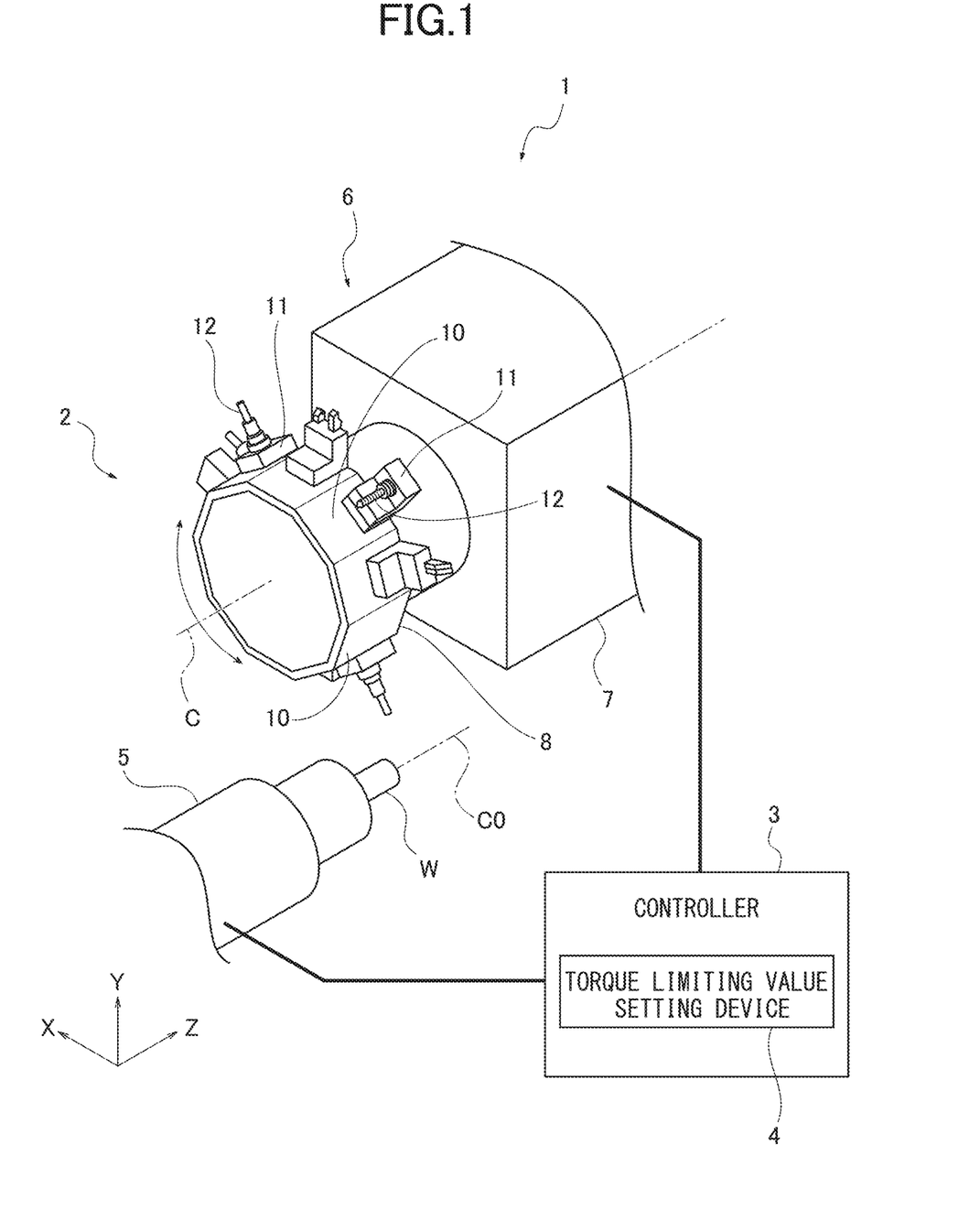
FIG. 1 is an approximately perspective view illustrating a turret tool post of an automatic lathe including a torque limiting value setting device according to a first embodiment of the present disclosure.
Figure 2:
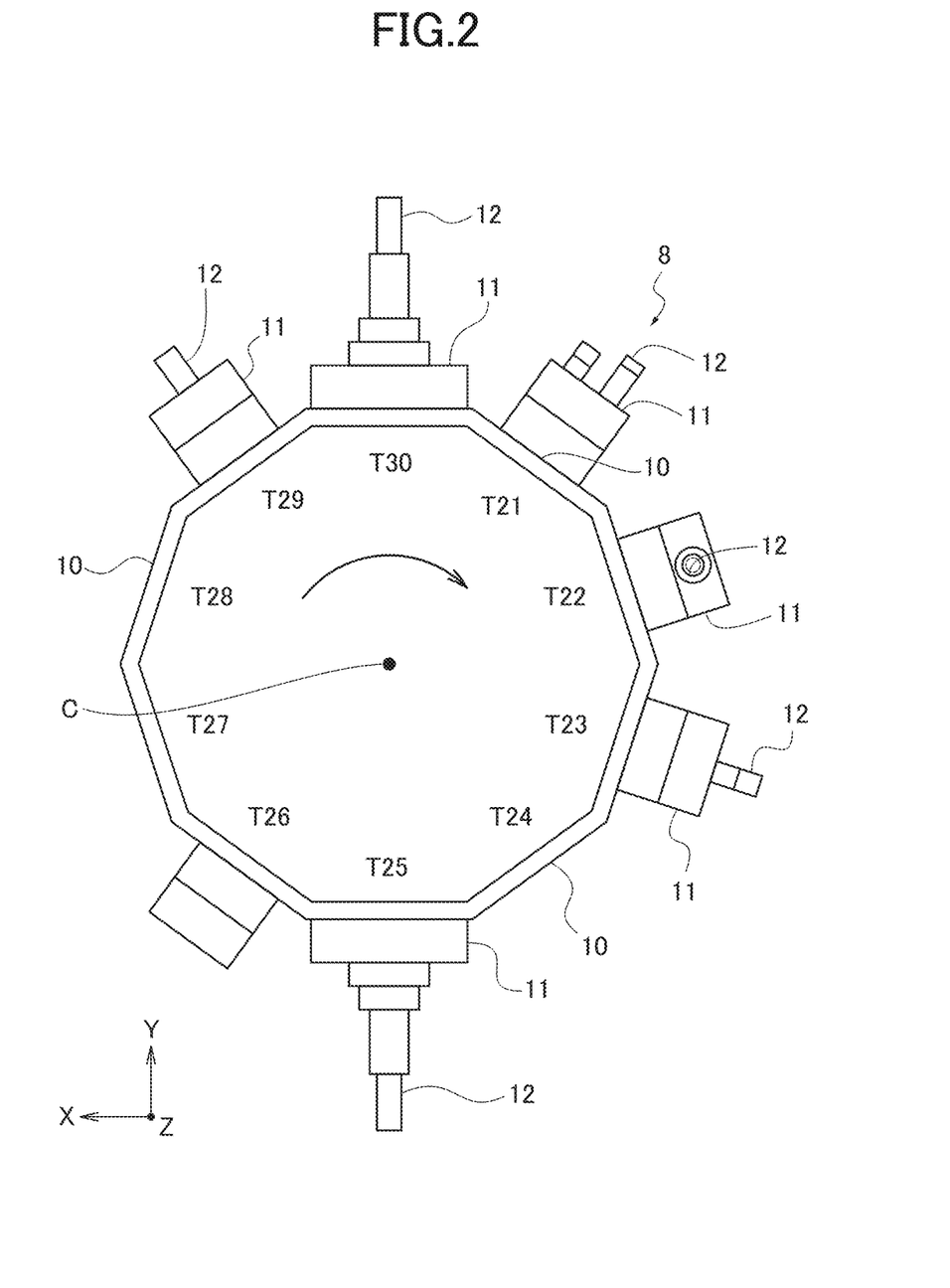
FIG. 2 is an approximately plan view of a turret, illustrating a relationship between a turret face and a turret face number and a relationship among each turret face, a tool holder mounted on the turret face, and a tool mounted on the tool holder.
Figure 3:
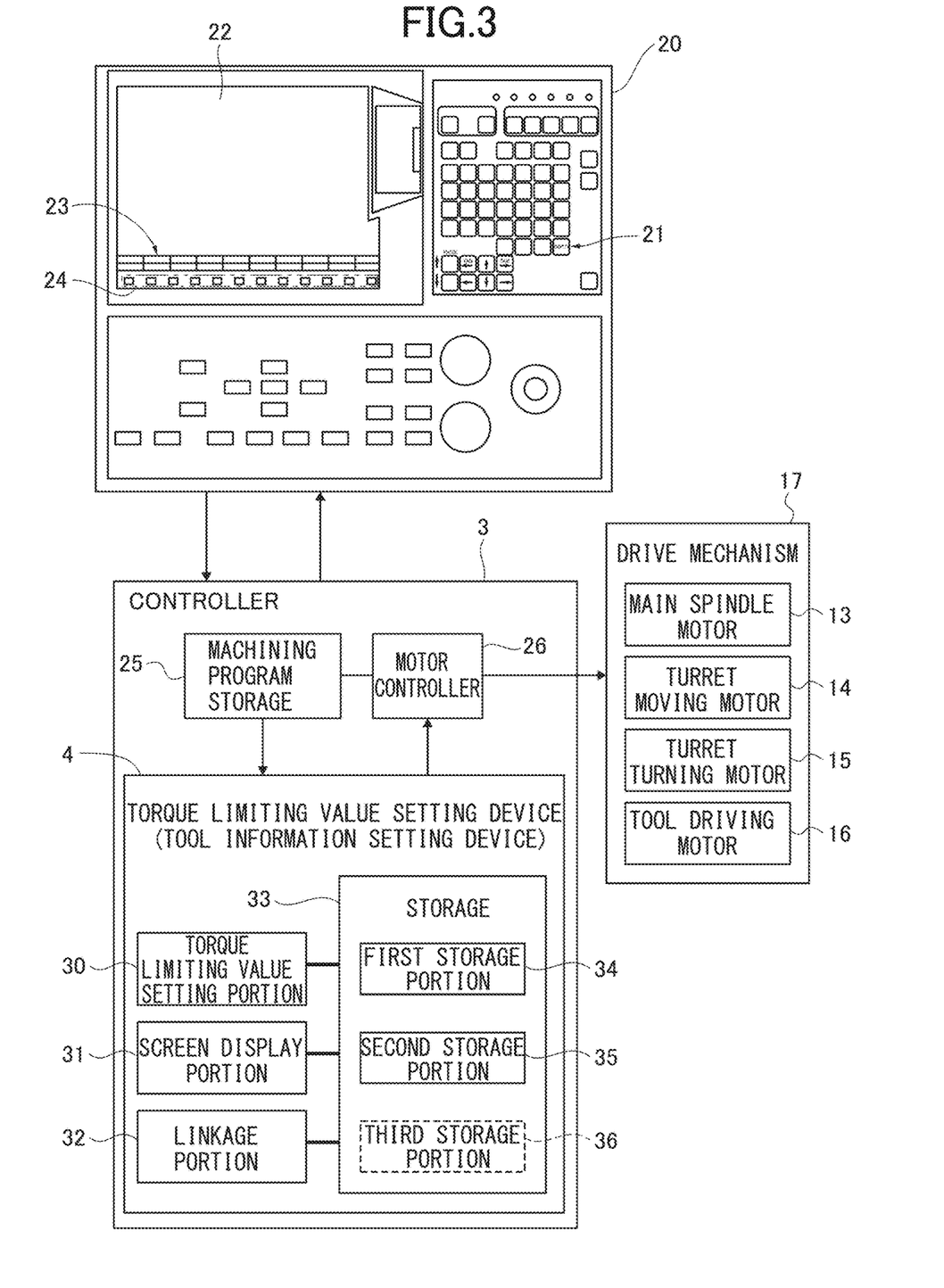
FIG. 3 is a block diagram illustrating an operation of a controller including a torque limiting value setting device.

Hereinafter, a torque limiting value setting device as a tool information setting device and a machine tool including the torque limiting value setting device according to a first embodiment will be described with reference to drawings. FIG. 1 is an approximately perspective view illustrating a turret tool post of an automatic lathe which is a machine tool including a torque limiting value setting device according to the first embodiment. FIG. 2 is an approximately plan view of a turret. FIG. 3 is a block diagram illustrating an operation of a controller including the torque limiting value setting device (tool information setting device).

As illustrated in the drawings, an automatic lathe 1 includes a machining main body 2 that processes a workpiece W, a controller 3 that controls an operation of the machining main body 2, and a torque limiting value setting device (tool information setting device) 4 that sets a torque limiting value as tool information. In this embodiment, the torque limiting value setting device 4 is provided inside the controller 3.

The machining main body 2 includes a main spindle 5 as a workpiece holder that holds the workpiece W and a turret tool post 6. The main spindle 5 is supported by a spindle headstock in a rotatable and drivable manner about an axis line C0. A center axis C of the turret tool post 6 is disposed to be parallel with the axis line C0 of the main spindle 5 (Z axis direction in FIG. 1). The turret tool post 6 includes a tool post main body 7 and a turret 8 supported by the tool post main body 7 in a turnable and drivable manner about the center axis C. The tool post main body 7 is provided in a movable manner in the Z axis direction which is the axis line C0 direction of the main spindle 5 as well as an X axis direction and a Y axis direction which are orthogonal to the Z axis direction.

The turret 8 is movable in the Z axis direction, the X axis direction, and the Y axis direction by the movement of the tool post main body 7. As illustrated in FIG. 2, the turret 8 of the present embodiment has a regular decagon shape in a planer view, and includes on an outer circumference surface thereof a plurality of turret faces 10. Note that the shape of the turret 8 is not limited to the regular decagon shape, and may be a polygon in addition to a decagon or may be a shape in addition to a polygon as long as it can be provided with a plurality of turret faces 10. Various types of tool holders 11 are detachably mounted on the respective turret faces 10, respectively. Each tool holder 11 is provided with a predetermined tool 12 for machining through a mounting portion provided in the tool holder 11.

The machining main body 2 includes a drive mechanism 17 having a main spindle motor 13 that rotates the main spindle 5, a turret moving motor 14 that moves the turret tool post 6, a turret turning motor 15 that turns the turret 8, and a tool driving motor 16 that rotates the tool 12 of a predetermined tool holder 11 mounted on the turret face 10.

The rotation of the main spindle 5, the turning of the turret 8, and the movement of the turret 8 (tool post main body 7) are controlled by the controller 3 made of an NC device. As illustrated in FIG. 3, an operation panel 20 for use in the operation of the controller 3, for example, is connected to the controller 3. The operation panel 20 is provided with various switches 21, a monitor 22 of a display, a menu switch 24 corresponding to a menu bar 23 displayed on the monitor 22, and the like.

The controller 3 includes a central processing unit (CPU), a memory such as a ROM and a RAM, and a storage such as hard disk drive (HDD). Machining programs are previously input to the controller 3. The input machining programs are stored in a machining program storage 25 provided in a memory or a storage. The controller 3 includes a motor controller 26 that controls the drive mechanism 17 such as the main spindle motor 13, the turret moving motor 14, the turret turning motor 15, and the tool driving motor 16.

In the automatic lathe 1, the motor controller 26 of the controller 3 controls the drive mechanism 17 based on the machining program of the machining program storage 25 to turn and move the turret 8, and to rotate the tool 12. The tool 12 thereby automatically executes predetermined machining to a material held by the main spindle 5. The tool 12 required for machining is selected by the turning and the moving of the turret 8. The machining by the tool 12 is executed based on a torque limiting value set by the torque limiting value setting device 4.

As illustrated in FIG. 2, each turret face 10 of the turret 8 has a previously allocated T code (in this embodiment, T20 to T29) of a turret face number for distinguishing each turret face 10. The respective T codes are set to have different numbers, respectively. Each tool 12 attached to each tool holder 11 mounted on each turret face 10 has an offset value previously allocated to correspond to an offset number. The offset value is for correcting the wear of each tool 12 or the like. The offset value is stored in a memory or a storage device.

Each tool 12 mounted on the tool holder 11 on which each of a plurality of tools 12 is mountable has a correction value allocated to correspond to a coordinate correction value number. The correction value is stored in a memory or a storage device. The correction value for correcting the position of the tool 12 to which the coordinate correction value number is set with respect to the coordinate position assumed by the machining program is associated with the coordinate correction value number to be stored in a memory or a storage device.

The controller 3 is configured to select a predetermined tool 12 by a tool selection number having the continuing T code on which the tool 12 is mounted, offset number, and coordinate correction value number of the tool 12. For example, the tool 12 which is mounted on the turret face number T20 and of which the offset number 00 is set to the coordinate correction value number R1 is selected by describing the tool selection number of T2000R1 in the machining program as a command code of a tool selection instruction.

In this case, the controller 3 (motor controller 26) turns the turret 8 by controlling the turret turning motor 15. Next, the controller 3 indexes the tool 12 selected by indexing the turret face 10 having the T code of T20 in a predetermined angle position to correct the position of the tool 12 with the offset value of the offset number 00. Together with this correction, the controller 3 sets the coordinate system of the X axis, the Y axis, and the Z axis based on the correction value previously set to the coordinate correction value number of R1. Accordingly, by controlling the turret moving motor 14 with the moving instruction of the X axis, the Y axis, and the Z axis, the turret 8 moves by correcting the position of the selected tool 12, and machines the workpiece W with the tool 12.

Figure 4:
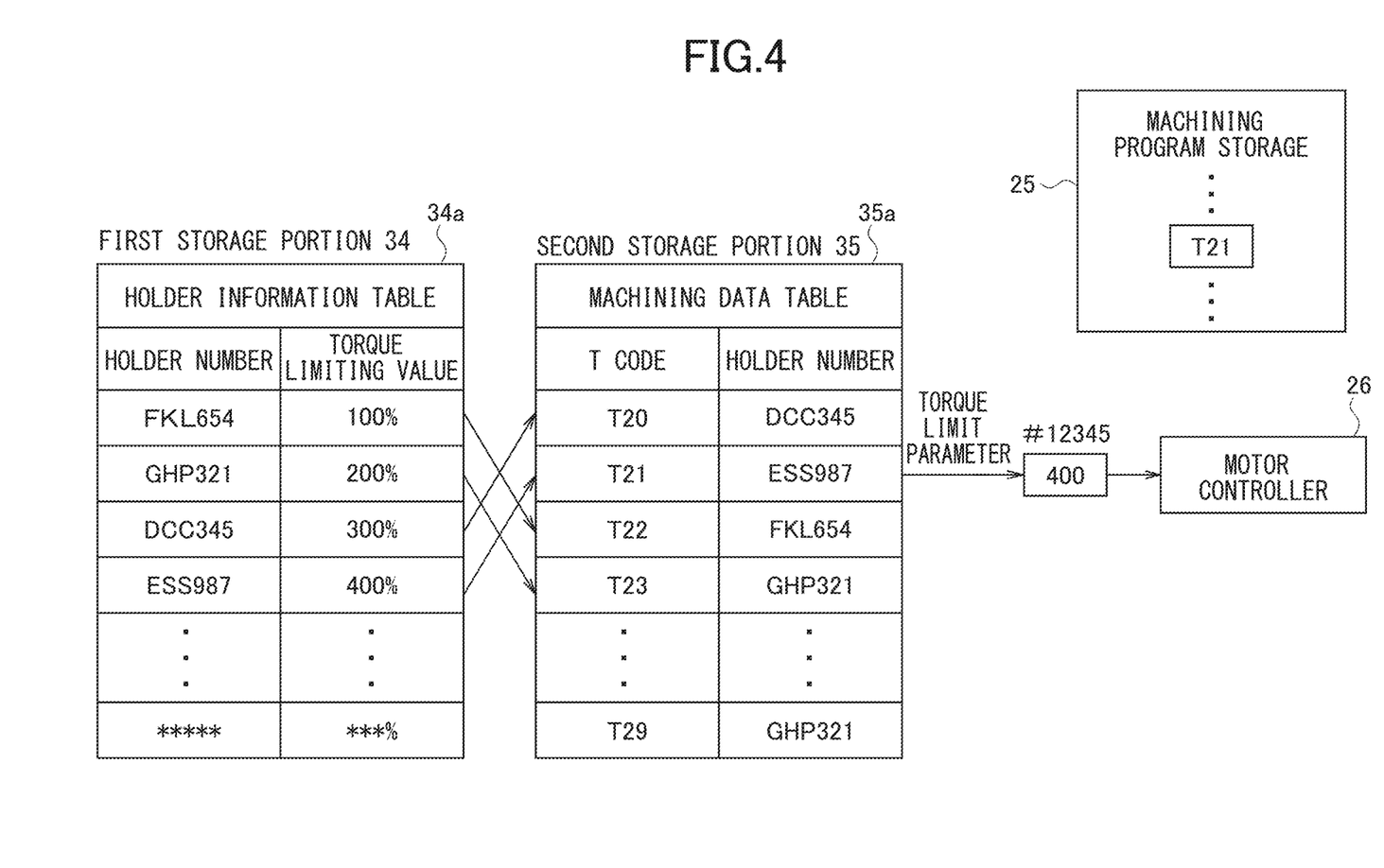
FIG. 4 is a diagram illustrating table configurations of databases stored in a first storage portion and a second storage portion and a relationship with T codes of a machining program in the first embodiment of the present disclosure.

On the other hand, each tool holder 11 to be mounted on each turret face 10 has a previously set holder number which is a tool holder number for distinguishing each tool holder 11 and a previously set torque limiting value of each tool holder 11 (see FIG. 4). The holder number is FKL654, GHP321, DCC345, and ESS987, for example. The torque limiting value is, 100%, 200%, 300%, and 400%, for example.

In the present embodiment, the tool information setting device operates as the torque limiting value setting device 4. As illustrated in FIG. 3, the torque limiting value setting device 4 includes a torque limiting value setting portion 30 (tool information setting portion) that sets the torque limiting value, a screen display portion 31 that creates various screens to display the screens on the monitor 22, a linkage portion 32 that associates the T code and the holder number, and a storage 33. The storage 33 includes a storage device such as HDD and a memory, and includes a first storage portion 34 and a second storage portion 35.

FIG. 4 is a diagram illustrating the table configurations of the databases stored in the first storage portion 34 and the second storage portion 35 and the relationship with the T codes of the machining program. As illustrated in FIG. 4, the first storage portion 34 stores a holder information table 34a in which the holder numbers of a plurality of tool holders 11 mountable to the respective turret faces 10 are associated with the torque limiting values. The second storage portion 35 stores a machining data table 35a in which the T codes are associated with the holder numbers of the tool holders 11 mounted on the turret faces 10 corresponding to the respective T codes.

The data of the first storage portion 34 and the second storage portion 35 may be previously stored in factory shipment and initial setting, or may be freely set by an operator of the automatic lathe 1 through the operation panel 20. In this embodiment, the first storage portion 34 previously stores the holder information table 34a, and the machining data table 35a of the second storage portion 35 can be freely set by an operator of the automatic lathe 1 through the operation panel 20.

Figure 5:
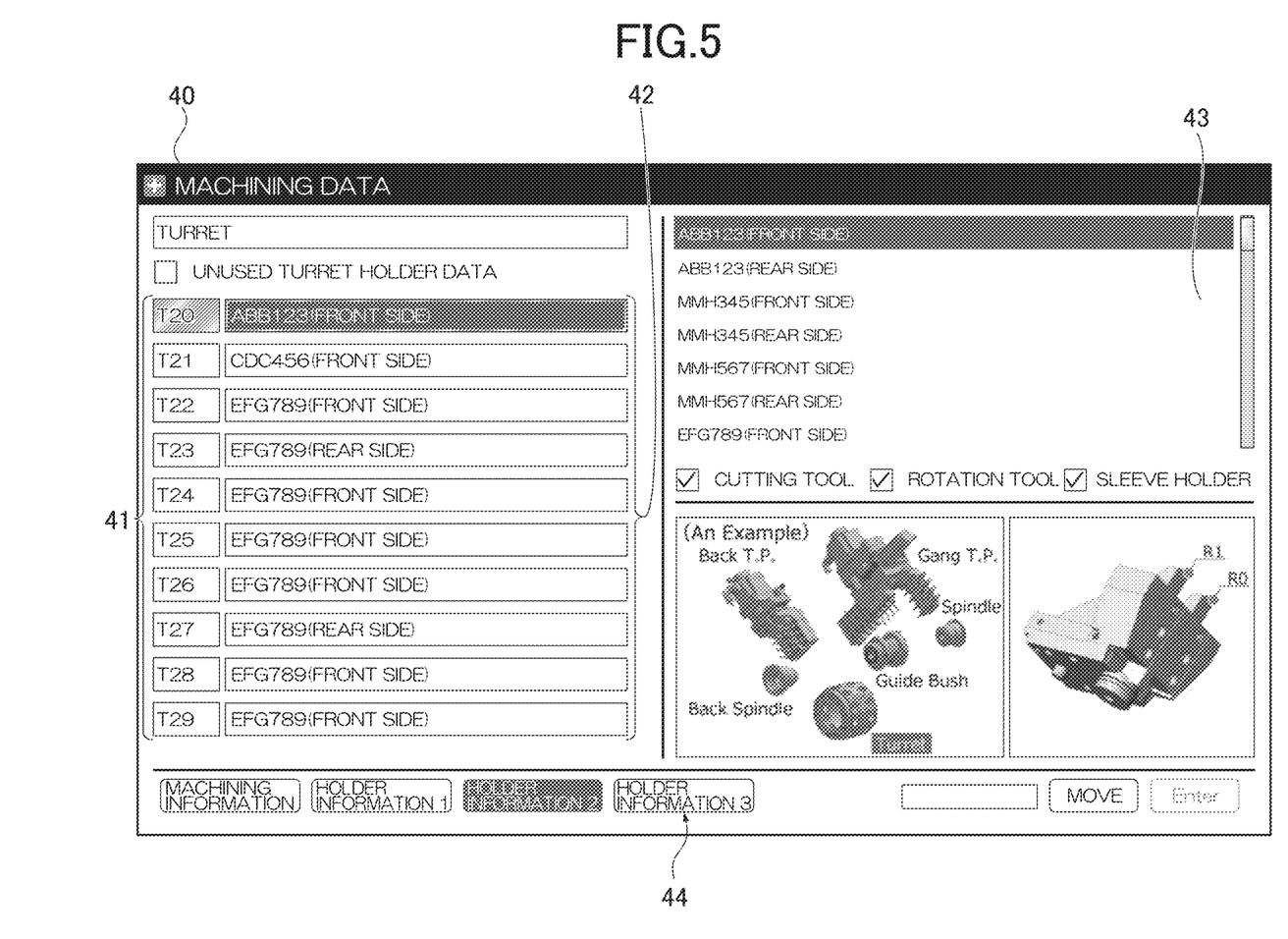
FIG. 5 is a view illustrating a tool holder selection screen.

For this setting, the screen display portion 31 displays a tool holder selection screen 40 as illustrated in FIG. 5 on the monitor 22. The left column of the tool holder selection screen 40 is provided with a T code display area 41 for displaying the T codes of the turret faces 10 and a holder selection area 42 for selecting the tool holder 11 with respect to each T code (each turret face 10). The right column of the tool holder selection screen 40 is provided with a holder information display area 43 for displaying detailed information such as the holder number and the image of the tool holder 11 selected in the holder selection area 42. The lower column of the tool holder selection screen 40 is provided with a menu bar 44 for selecting and displaying the machining information and the holder information.

An operator can select a predetermined tool holder 11 to be mounted on the turret face 10 in the holder information display area 43 of the tool holder selection screen 40. An operator can thereby simply and freely set the holder number to associate with the T code.

The linkage portion 32 stores the combination of the T code and the holder number set on the tool holder selection screen 40 in the machining data table 35a of the second storage portion 35.

The torque limiting value setting portion 30 acquires the holder number from the second storage portion 35 based on the T code of the tool selection number described in the machining program to select a predetermined tool 12, and acquires the torque limiting value from the first storage portion 34 based on the acquired holder number. The torque limiting value setting portion 30 sends the acquired torque limiting value to the motor controller 26 as a torque limit parameter of the machining torque.

The motor controller 26 of the controller 3 turns the turret 8 based on the T code described in the machining program, indexes the turret face 10 corresponding to the T code, and selects a predetermined tool 12 mounted on the indexed turret face 10. The motor controller 26 controls the workpiece W to machine with the tool 12 within an appropriate machining torque range, which does not exceed the torque limiting value, based on the torque limiting value (torque limit parameter) received from the torque limiting value setting device 4.

Figure 6:
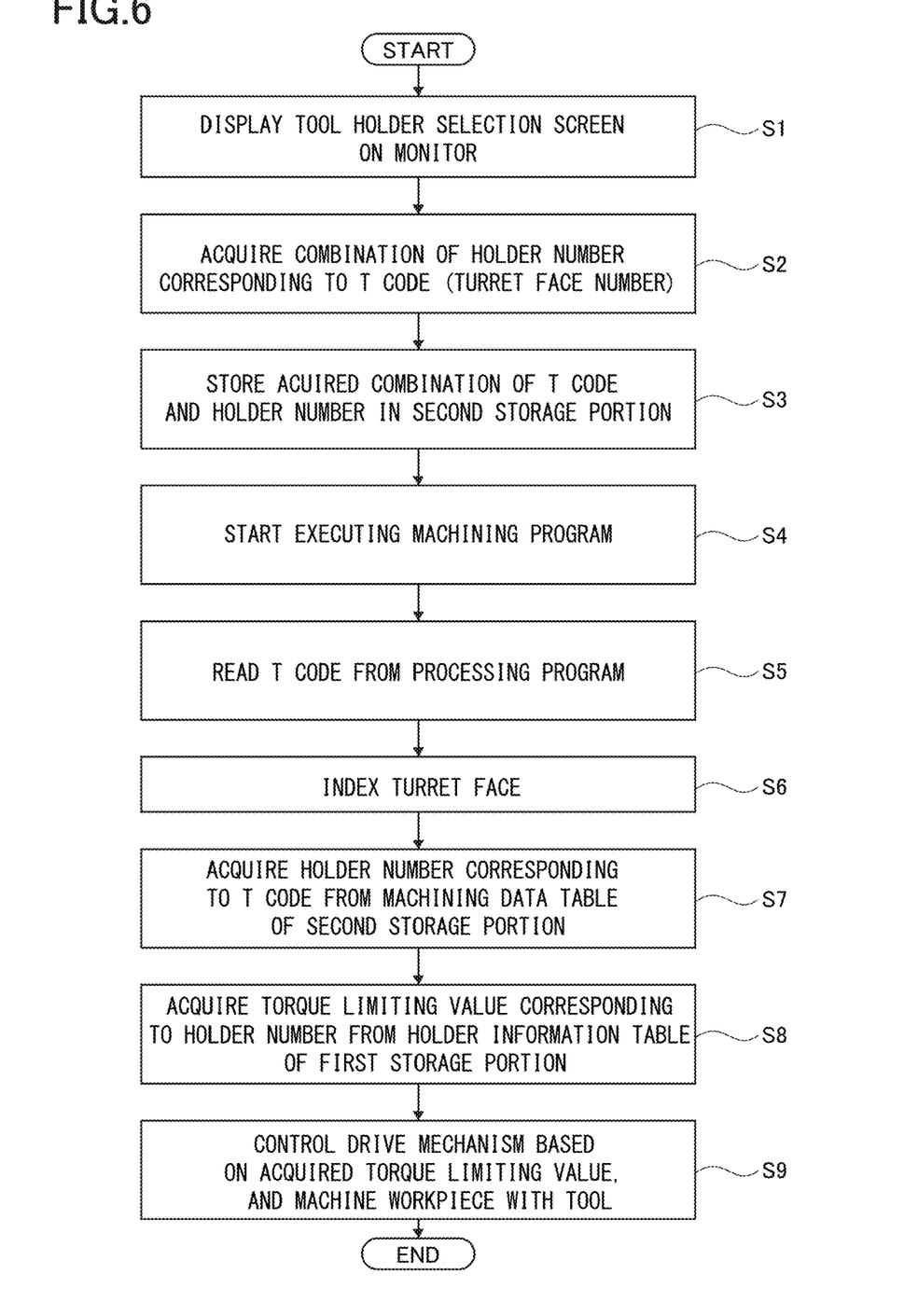
FIG. 6 is a flowchart showing one example of an operation of an automatic lathe including a torque limiting value setting device of the first embodiment of the present disclosure.

Hereinafter, one example of the operation of the automatic lathe 1 including the torque limiting value setting device 4 of the above configuration will be described with reference to the flowchart of FIG. 6. As described above, the respective holder numbers of a plurality of tool holders 11 mountable to the turret faces 10 and the torque limiting values of the tool holders 11 corresponding to the respective holder numbers are previously stored in the holder information table 34a of the first storage portion 34.

An operator mounts the tool 12 required for machining on each turret face 10 of the turret 8 through a predetermined tool holder 11. Next, an operator operates the operation panel 20 to instruct the display of the tool holder selection screen 40 to the controller 3.

Upon the reception of this instruction, in Step S1, the screen display portion 31 displays the tool holder selection screen 40 on the monitor 22. An operator sets the holder number of the tool holder 11 mounted on the turret face 10 with respect to the turret face number of each turret face 10. In this embodiment, after mounting the tool holder 11 on the turret face 10, Step S1 is executed. However, the order is not limited thereto. After executing Step S1, an operator may mount the tool holder 11 on the turret face 10 based on the set information of the tool holder 11.

When an operator performs a termination operation of the setting on the tool holder selection screen 40, the combination of the turret face number and the holder number set to correspond to the turret face number is informed to the linkage portion 32. The linkage portion 32 acquires the combination of the turret face number and the holder number (Step S2), and stores the combination in the machining data table 35a of the second storage portion 35 (Step S3).

Next, when an operator operates the operation panel 20 to instruct the machining start, the controller 3 starts executing the machining program of the machining program storage 25 in response to the reception of this machining start instruction (Step S4). More specifically, the controller 3 sequentially calls the machining instruction (instruction code) described in the machining program to execute, and performs the machining operation of the workpiece W by the machining main body 2.

In the process of the execution of this machining instruction, the controller 3 reads the T code of the turret face 10 (Step S5) by the selection instruction (command code) of a predetermined tool 12 for use in the machining from the machining program. Then, the motor controller 26 of the controller 3 drives the turret turning motor 15 based on the T code to index the turret face 10 (Step S6). For example, in the example illustrated in FIG. 4, the controller 3 reads "T21" as the T code from the machining program. The turret face 10 corresponding to "T21" is indexed by the motor controller 26, and the tool 12 mounted on the turret face 10 through the tool holder 11 is indexed by the offset value of the offset number and the correction value of the coordinate correction value number designated together with T21.

In this case, as the torque limiting value when machining with the indexed tool 12 is acquired, the torque limiting value setting portion 30 acquires the holder number corresponding to the T code from the machining data table 35a of the second storage portion 35 by the instruction from the controller 3 (Step S7). In FIG. 4, the torque limiting value setting portion 30 acquires "ESS987" associated with "T21". Next, the torque limiting value setting portion 30 acquires the torque limiting value corresponding to the holder number from the holder information table 34a of the first storage portion 34 based on the holder number acquired in Step S7, and sends the torque limiting value to the motor controller 26 (Step S8). More specifically, as illustrated in FIG. 4, the torque limiting value setting portion 30 acquires "400%" as the torque limiting value, and writes "400" (torque limit parameter) in an address "#12345" on the memory.

The motor controller 26 reads the torque limiting parameter "400" from the address of "#12345", and receives the parameter as the torque limiting value from the torque limiting value setting portion 30. The motor controller 26 controls the drive mechanism 17, so that the tool 12 machines the workpiece W by an appropriate machining torque which does not exceed the torque limiting value (Step S9).

Second Embodiment

Next, a torque limiting value setting device which is a tool information setting device and an automatic lathe which is a machine tool including the torque limiting value setting device according to a second embodiment will be described. A torque limiting value setting device 4 and an automatic lathe 1 according to the second embodiments have a basic configuration which is the same as that of the torque limiting value setting device 4 and the automatic lathe 1 according to the first embodiment illustrated in FIG. 1, except that the torque limiting value setting device 4 and the automatic lathe 1 according to the second embodiment further include a third storage portion 36 illustrated with a broken line in FIG. 3. Accordingly, hereinafter, a configuration different from that of the first embodiment will be mainly described, and the detailed description will be omitted for the same configuration as that of the first embodiment.

Figure 7:
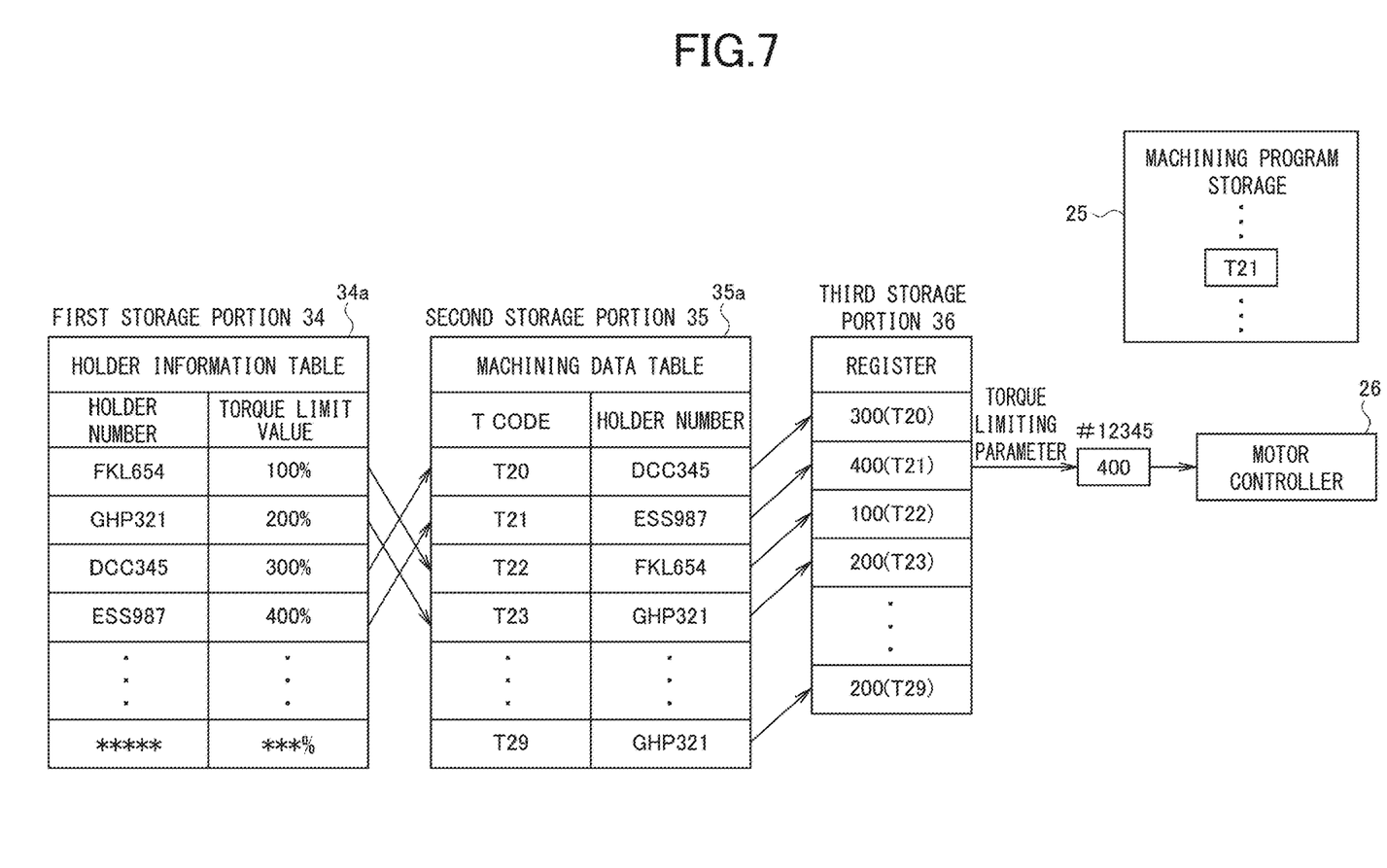
FIG. 7 is a diagram illustrating table configurations of databases stored in a first storage portion, a second storage portion, and a third storage portion and a relationship with T codes of a machining program in a second embodiment of the present disclosure.

FIG. 7 is a diagram illustrating table configurations of databases stored in the first storage portion 34, the second storage portion 35, and the third storage portion 36 and the relationship with the T codes of the machining program. As illustrated in FIG. 7, the first storage portion 34 previously stores a holder information table 34*a* in which holder numbers are associated with torque limiting values, similar to the first embodiment. The second storage portion 35 stores a machining data table 35*a* in which the T codes are associated with the holder numbers, similar to the first embodiment. In the second embodiment, the combination of the T code and the holder number which is stored in the second storage portion 35 is set on the tool holder selection screen 40.

The third storage portion 36 stores the torque limiting values associated with the T codes based on the data stored in the first and second storage portions 34, 35. In the second embodiment, a register of a CPU is used as the third storage portion 36; however, it is not limited thereto.

The torque limiting value setting portion 30 acquires the holder number corresponding to each T code from the second storage portion with respect to each T code, and acquires the torque limiting value corresponding to the holder number from the first storage portion 34 based on the acquired holder number. The torque limiting value setting portion 30 stores the acquired torque limiting value in the third storage portion 36 to associate with the T codes. More specifically, as illustrated in FIG. 7, the torque limiting value setting portion 30 sequentially sets the acquired torque limiting value in order of T code (T20 to T29) to the resistor which is the third storage portion 36.

When executing the machining program, the torque limiting value setting portion 30 acquires the torque limiting value from the third storage portion 36 based on the T code of the tool selection number described in the machining program to select a predetermined tool 12. The motor controller 26 controls workpiece W to machine the workpiece W with the tool 12 within an appropriate machining torque range which does not exceed the torque limiting value.

Figure 8:
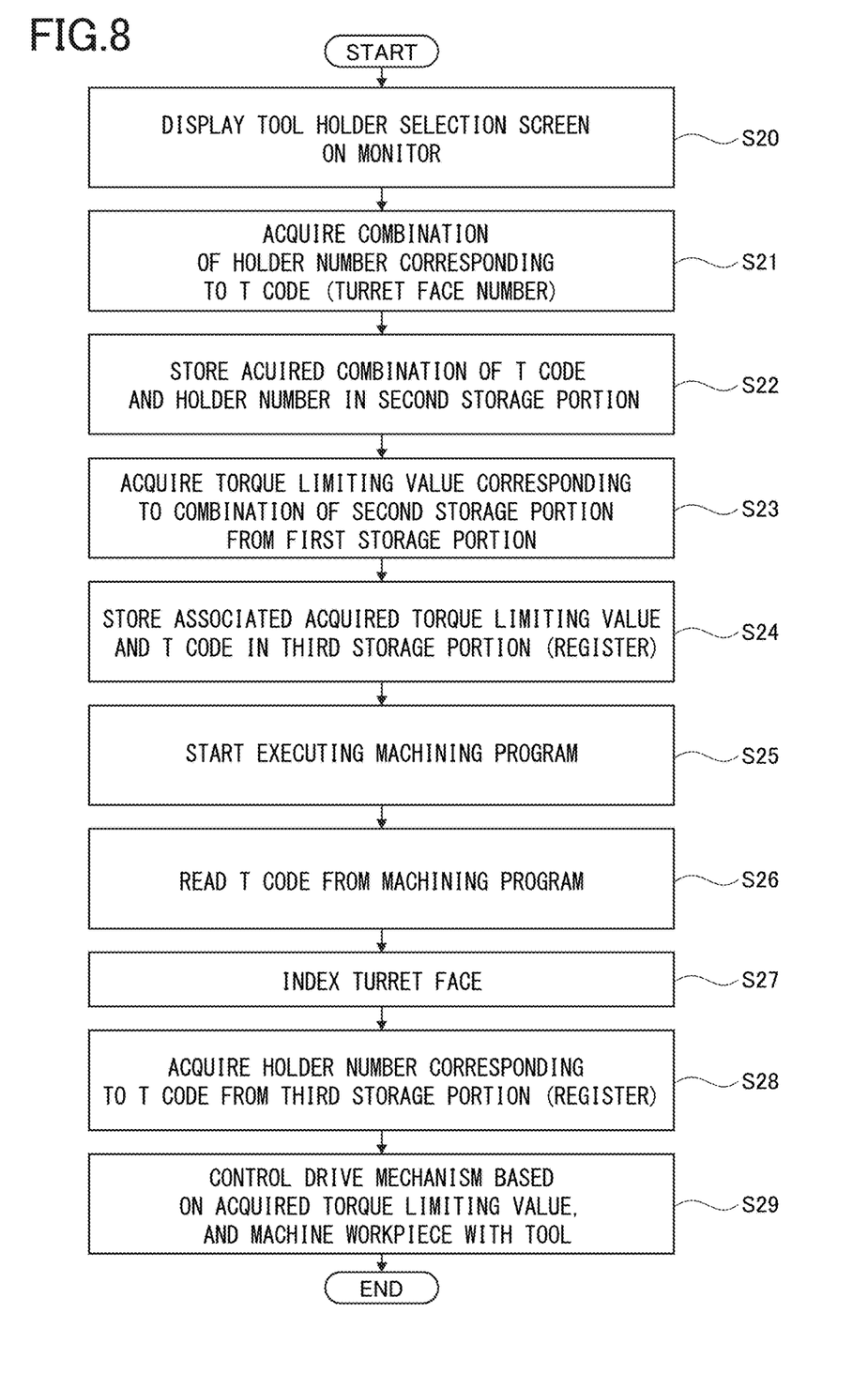
FIG. 8 is a flowchart showing one example of an operation of an automatic lathe including a torque limiting value setting device of the second embodiment of the present disclosure.

Hereinafter, one example of the operation of the automatic lathe 1 including the torque limiting value setting device 4 according to the second embodiment will be described with reference to the flowchart of FIG. 8. In the second embodiment, the respective holder numbers of a plurality of tool holders 11 mountable to the turret faces 10 and the torque limiting values of the tool holders 11 corresponding to the respective holder numbers are previously stored in the holder information table 34*a* of the first storage portion 34.

The tool 12 required for machining is mounted on each turret face 10 of the turret 8 by an operator through a predetermined tool holder 11.

When an operator operates the operation panel 20 to instruct the display of the tool holder selection screen 40 to the controller 3, the screen display portion 31 which has received this instruction displays the tool holder selection screen 40 on the monitor 22 in Step S20. In Step S21, the linkage portion 32 acquires the combination of the T code and the holder number set on the tool holder selection screen 40, and stores the combination in the machining data table 35*a* of the second storage portion 35 in Step S22.

Next, in Step S23, the torque limiting value setting portion 30 acquires all combinations of the T codes and the holder numbers from the second storage portion 35, and acquires the torque limiting value corresponding to the T code from the first storage portion 34 based on the holder number of each combination. In next Step S24, the torque limiting value setting portion 30 associates the acquired each torque limiting value with the T code to be stored in the third storage portion 36 (see FIG. 7).

Next, in Step S25, the controller 3 starts executing the machining program, similar to the first embodiment. In Step S26, the controller 3 reads the T code of the turret face 10 by the selection instruction (command code) of a predetermined tool 12 for use in the machining from the machining program. Then, in Step S27, the motor controller 26 drives the turret turning motor 15 based on the T code to index the turret face 10, so that the tool 12 is indexed. In the example illustrated in FIG. 7, the turret face 10 corresponding to the T code "T21" is indexed, and the tool 12 mounted on the turret face 10 through the tool holder 11 is indexed by the offset value of the offset number and the correction value of the coordinate correction value number designated together with T21.

In Step S28, the torque limiting value setting portion 30 acquires the torque limiting value corresponding to the T code, and sends the value to the motor controller 26. In the example illustrated in FIG. 7, the torque limiting value setting portion 30 acquires the torque limiting value "400%" associated with the T code "T21" to write "400" in the address "#12345" over the memory to send the torque limiting value to the motor controller 26.

In Step S29, the motor controller 26 reads the torque limit parameter "400" from the address "#12345", and receives the parameter as the torque limiting value from the torque limiting value setting portion 30. The motor controller 26 controls the drive mechanism 17, so that the tool 12 machines the workpiece W by an appropriate machining torque which does not exceed the torque limiting value.

As described above, according to the first and second embodiments, when selecting a predetermined tool 12 by the T code (turret face number) of the mounted turret 8, the torque limiting value setting portion 30 acquires the holder number (tool holder number) associated with the T code from the second storage portion 35 based on the T code (turret face number) of the tool selection number described in the machining program. The torque limiting value setting portion 30 acquires the torque limiting value associated with the holder number from the first storage portion based on the acquired holder number.

Accordingly, the first and second embodiments index the turret face 10 based on the T code described in the machining program while executing the machining program, so that the tool 12 mounted on the turret face 10 through the tool holder 11 can be simply and freely selected. Moreover, the torque limiting value corresponding to the selected tool 12 can be simply and appropriately acquired based on the T code to send the value to the motor controller 26 (or controller 3). Even when the tool holder 11 to be mounted on the turret face 10 is changed, an appropriate torque limiting value corresponding to the changed tool holder 11 can be acquired by updating the second storage portion 35. As described above, the torque limiting value setting device 4 capable of setting the torque limiting value simply and appropriately to the tool 12 mounted on the turret face 10 corresponding to the T code through the tool holder 11 can be provided.

The automatic lathe 1 which is the machining tool according to the first and second embodiments indexes the turret face 10 based on the T code (turret face number) described in the machining program to select the tool 12 mounted on the turret face 10 through the tool holder 11. The motor controller 26 (or controller 3) controls the machining with the tool 12 based on the torque limiting value set by the torque limiting value setting device 4 based on the T code. The machining with the tool can be thereby simply and appropriately executed within an appropriate machining torque range which does not exceed the torque limiting value.

In the first and second embodiments, the torque limiting value setting device 4 which is the tool information setting device includes the screen display portion 31 that displays, on the monitor 22, the tool holder selection screen 40 for selecting the tool holder 11 to be mounted on the turret face 10 (display portion), and the linkage portion 32 that associates the holder number (tool holder number) of the tool holder 11 selected by the tool holder selection screen 40 with the T code (turret face number) of the turret face 10 to be stored in the first storage portion 34.

An operator can thereby more simply and freely select the tool 12 to be mounted on each turret face 10 through the tool holder 11. The linkage portion 32 stores the torque limiting value corresponding to the tool holder 11 of the selected tool 12 in the first storage portion 34, so that the torque limiting value setting portion 30 can set an appropriate torque limiting value to the tool 12 of the tool holder 11.

In the second embodiment, the torque limiting value setting device 4 includes the third storage portion 36 that stores the respective T codes (turret face numbers) of a plurality of turret faces 10 and the torque limiting values which are associated with each other. The torque limiting value setting portion 30 acquires the combination of the T code (turret face number) and the holder number (tool holder number) from the second storage portion 35, and acquires each torque limiting value from the first storage portion 34 based on the holder number (tool holder number) of each combination. The torque limiting value setting portion 30 stores each of the acquired torque limiting values associated with the T code (turret face number) in the third storage portion 36. Then, the torque limiting value setting portion 30 acquires the torque limiting value from the third storage portion 36 based on the T code (turret face number) described in the machining program.

The torque limiting value can be quickly and effectively set to the tool 12 mounted on the turret face 10 through the tool holder 11 based on the T code (turret face number), so that the execution speed of the machining program can be increased, and thus, the machining efficiency can be improved.

In the embodiments of the present disclosure, the example in which the torque limiting value is set to the holder number is described. However, the value which can be set to the holder number is not limited to the torque limiting value. For example, a distance of each axis (X axis, Y axis, and Z axis) to the workpiece W of the edge of the tool 12 disposed in the turret face 10 through a predetermined tool holder 11 can be set as the tool information (core, diameter, longitudinal). Hereinafter, a third embodiment having a core, a diameter, and a long side as the tool information will be described.

Third Embodiment

An automatic lathe which is a machine tool including a tool information setting device in a third embodiment will be described with reference to FIG. 3. The tool information setting device 4 and the automatic lathe 1 according to the third embodiment include the basic configuration similar to the first embodiment and the second embodiment illustrated in FIG. 3, except that the tool information setting device (torque limiting value setting device) 4 illustrated in FIG. 3 operates as a position information setting device and the torque limiting value setting portion 30 operates as a position information setting portion. Accordingly, hereinafter the configuration different from that of the first embodiment and the second embodiment will be mainly described, and the detailed description for the configuration similar to that of the first embodiment and the second embodiment will be omitted.

The tool information in the third embodiment is the position information of the tool 12 which is the third dimensional position information of the core, the diameter, and the long side for setting the coordinate position of the edge of the tool 12 for use when cutting the outer form and cutting the inner diameter in the machining of the workpiece W held by the main spindle with the tool 12, for example. The core is the coordinate position of the X axis in the X direction at which the edge has contact with the workpiece W by moving the tool 12 with the tool post, for example. The diameter is similarly the coordinate position of the Y axis of the edge of the tool 12 in the Y direction. The long side is the coordinate position of the Z axis of the edge in the Z direction with respect to the end face position of the workpiece W. By setting these three tool information items, the coordinate position of the machining point for starting the machining to the workpiece W can be set.

Figure 9:
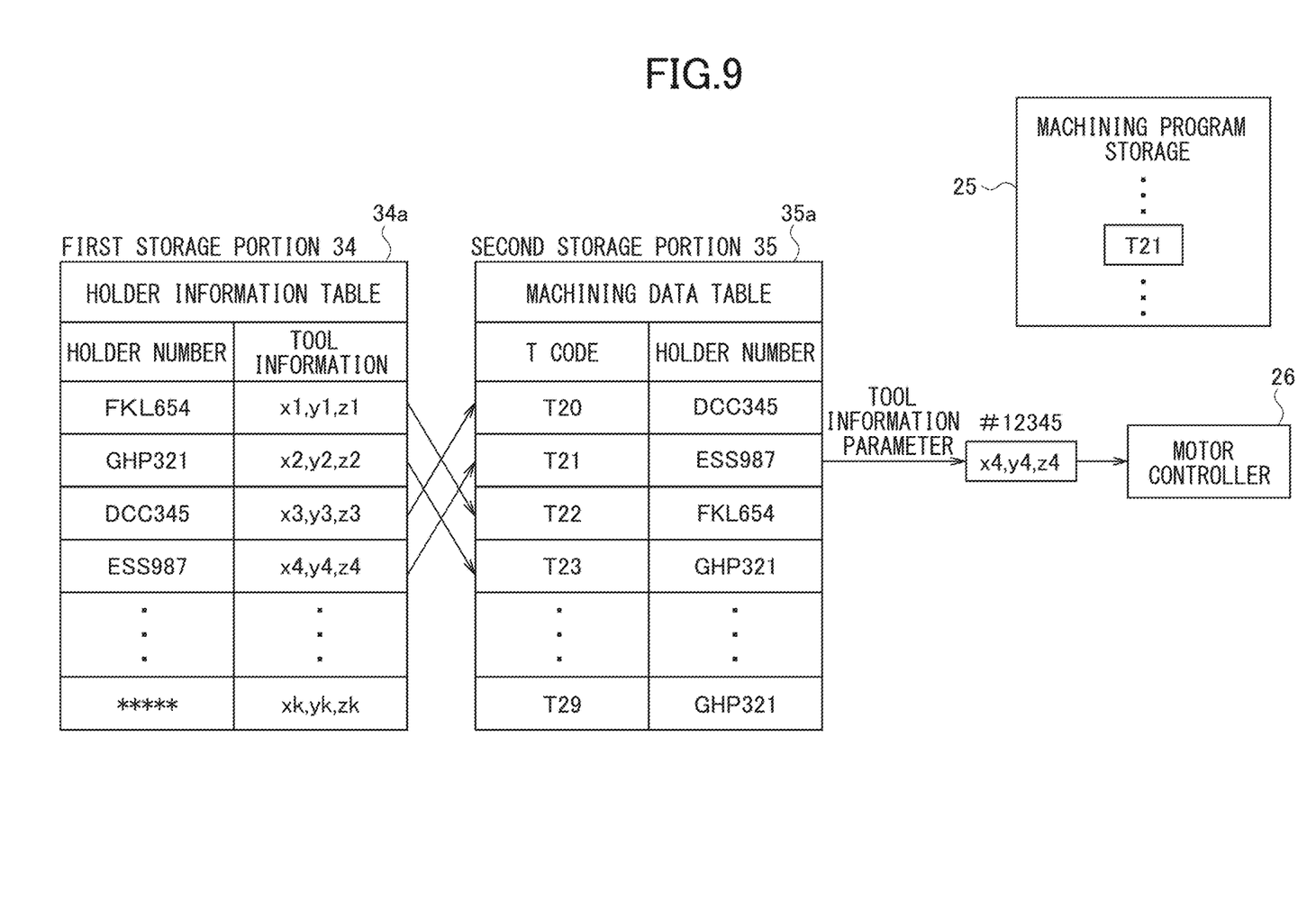
FIG. 9 is a diagram illustrating table configurations of databases stored in a first storage portion and a second storage portion and a relationship with T codes of a machining program in a third embodiment of the present disclosure.

FIG. 9 shows table configurations of databases stored in the first storage portion 34 and the second storage portion 35 and a relationship with the T codes of the machining program. As illustrated in FIG. 9, the first storage portion 34 stores a holder information table 34a in which the holder numbers of a plurality of tool holders 11 mountable to the respective turret faces 10 are associated with the position information (coordinate position of X axis of core, coordinate position of Y axis of diameter, and coordinate position of Z axis of long side Z axis) of the edge (machining point) of the tool 12 as the tool information. The second storage portion 35 stores a machining data table 35a in which the T codes are associated with the holder numbers of the tool holders 11 mounted on the turret faces 10 corresponding to the respective T codes to be set. The data can be set by the similar procedure with a screen similar to that of the first and second embodiments.

An example of the operation of the automatic lathe 1 including the tool information setting device 4 as the position information setting device in the third embodiment will be described while reading the flowchart of FIG. 6. In this case, the respective holder numbers of a plurality of tool holders 11 mountable on the turret faces 10 and the position information (tool information) of the tool holders 11 corresponding to the respective holder numbers are previously stored in the holder information table 34a of the first storage portion 34. An operator mounts the tool 12 on each turret face 10 of the turret 8 through a predetermined tool holder 11, and instructs the display of the tool holder selection screen 40 to the controller 3 by operating the operation panel 20.

Upon the reception of the instruction, in Step S1, the screen display portion 31 displays the tool holder selection screen 40 on the monitor 22. Next, in Step S2, the linkage portion 32 acquires the combination of the turret face number and the holder number set by an operator on the tool holder selection screen 40, and stores the combination in the machining data table 35a of the second storage portion 35 in Step S3.

In the next Step S4, upon the reception of the machining start instruction from an operator, the controller 3 starts executing the machining program of the machining program storage 25. In Step S5, the controller 3 reads the T code of the turret face 10 based on the selection instruction of the tool 12, and the motor controller 26 drives the turret turning motor 15 in Step S6 to index the turret face 10.

Next, in Step S7, the torque limiting value setting portion 30 that operates as the position information setting portion acquires the holder number corresponding to the T code from the machining data table 35a of the second storage portion 35. In the example of FIG. 9, for example, the position information setting portion acquires "ESS987" associated with "T21". Next, the position information setting portion acquires the tool information (position information) corresponding to the holder number from the holder information table 34a of the first storage portion 34 in Step S8, and sends the information to the motor controller 26. In the example illustrated in FIG. 9, the position information setting portion acquires "x4, y4, z4", and writes "x4, y4, z4" (tool information parameter) in the address "#12345" over the memory.

In Step S9, the motor controller 26 controls the drive mechanism 17 based on the tool information parameter "x4, y4, z4" read from the address "#12345", and positions the edge (machining point) of the tool 12.

As described above, in the third embodiment, the tool information setting device 4 as the position information setting device sets the holder number to each tool holder 11 and the information of the core, the diameter, and the long side which is the tool information of the tool 12 disposed in the tool holder 11, similar to the torque limiting value setting in the first embodiment and the second embodiment. Thereby, when exchanging the tool 12 together with the tool holder 11 to another turret face 10 from a predetermined turret face 10, the exchanged turret face number is changed. The setting of the tool information (position information of edge) when exchanging a tool can be simply changed.

As described above, the embodiments of the present disclosure have been described in details with reference to the drawings. However, the embodiments are merely the examples of the present disclosure, and the present disclosure is not limited to the configurations of the above embodiments. The present disclosure includes, for example, a change in a design without departing from the gist of the present disposure.

For example, in each of the above embodiments, the tool post on which the tool 12 and the tool holder 11 are mounted has been described as the turret. However, it is not limited thereto, and the present disclosure may be applicable to a tool and a tool holder which are disposed in a comb-blade type tool post.

What is claimed is:

1. A system comprising a machine tool and a tool information setting device for setting tool information for use in machining by the machine tool, wherein the machine tool comprises:
a turret including on a circumference surface thereof a plurality of turret faces, the turret configured to be turned by a turret turning motor and to be moved by a turret moving motor;
a plurality of tools respectively mounted on the plurality of turret faces each provided on the circumference surface of the turret through a tool holder according to machining, each of the plurality of tools configured to be rotated by a tool driving motor; and
a controller configured to execute a machining program, the controller including a motor controller configured to control a driving mechanism comprising the turret turning motor, the turret moving motor, and the tool driving motor, wherein the tool information setting device comprises:
a first storage configured to store a tool holder number for distinguishing a tool holder and tool information of a tool of the plurality of tools mounted on the tool holder, the tool holder number associated with the tool information;
a second storage configured to store a turret face number for distinguishing a turret face of the plurality of turret faces and the tool holder number of the tool holder mounted on the turret face, the turret face number associated with the tool holder number; and
a tool information setting portion configured to acquire the tool holder number from the second storage based on the turret face number described in the machining program, to acquire the tool information of the tool from the first storage based on the acquired tool holder number, and to control the driving mechanism based on the tool information by sending the acquired tool information for use in the machining to the motor controller when the controller executes the machining program, and wherein the motor controller indexes the turret face by turning the turret with the turret turning motor based on the turret face number described in the machining program to select a predetermined tool by the turret face number of the turret face on which the predetermined tool is mounted.

2. The system according to claim 1, further comprising:
a third storage configured to store the turret face number of the turret face and the tool information of the tool, the turret face number associated with the tool information, wherein the tool information setting portion is further configured to:
acquire a combination of the turret face number and the tool holder number associated with the turret face number from the second storage,
acquire the tool information from the first storage associated with the tool holder number of the combination,
associate the tool information acquired from the first storage with the turret face number acquired from the second storage,
store the associated tool information and the turret face number in the third storage, and
acquire the associated tool information from the third storage based on the turret face number described in the machining program.

3. The system according to claim 2, further comprising:
a screen display configured to display, on a display, a tool holder selection screen for selecting the tool holder to be mounted on the turret face; and
a link configured to associate the tool holder number of the tool holder selected on the tool holder selection screen with the turret face number to be stored in the first storage.

4. The system according to claim 2, wherein the tool information is a torque limiting value of a machining torque of the tool.

5. The system according to claim 2, wherein the tool information is position information of the tool.

6. The system according to claim 2, wherein the machine tool comprises the tool information setting device,
wherein a turret face number is designated to each of the plurality of turret faces provided on the circumference surface of the turret, and the motor controller turns the turret with the turret turning motor to select the predetermined tool by indexing a turret face of the plurality of turret faces based on the turret face number designated to the turret face mounted through the tool holder to machine a workpiece with the predetermined tool and the driving mechanism, and
wherein the controller is configured to select the tool mounted on the turret face through the tool holder by indexing the turret face with the motor controller and the turret turning motor based on the turret face number described in the machining program, and to control the machining with the tool and the driving mechanism based on the tool information by acquiring the tool information for use in machining set by the tool information setting device from the tool information setting device based on the turret face number, and to send the acquired tool information to the motor controller.

7. The system according to claim 1, further comprising:
a screen display configured to display, on a display, a tool holder selection screen for selecting the tool holder to be mounted on the turret face; and
a link configured to associate the tool holder number of the tool holder selected on the tool holder selection screen with the turret face number to be stored in the first storage.

8. The system according to claim 7, wherein the tool information is a torque limiting value of a machining torque of the tool.

9. The system according to claim 7, wherein the tool information is position information of the tool.

10. The system according to claim 7, wherein the machine tool comprises the tool information setting device,
wherein a turret face number is designated to each of the plurality of turret faces provided on the circumference surface of the turret, and the motor controller turns the turret with the turret turning motor to select the predetermined tool by indexing a turret face of the plurality of turret faces based on the turret face number designated to the turret face mounted through the tool holder to machine a workpiece with the predetermined tool and the driving mechanism, and
wherein the controller is configured to select the tool mounted on the turret face through the tool holder by indexing the turret face with the motor controller and the turret turning motor based on the turret face number described in the machining program, and to control the machining with the tool and the driving mechanism based on the tool information by acquiring the tool information for use in machining set by the tool information setting device from the tool information setting device based on the turret face number, and to send the acquired tool information to the motor controller.

11. The system according to claim 1, wherein the tool information is a torque limiting value of a machining torque of the tool.

12. The system according to claim 11, wherein the machine tool comprises the tool information setting device,
wherein a turret face number is designated to each of the plurality of turret faces provided on the circumference surface of the turret, and the motor controller turns the turret with the turret turning motor to select the predetermined tool by indexing a turret face of the plurality of turret faces based on the turret face number designated to the turret face mounted through the tool holder to machine a workpiece with the predetermined tool and the driving mechanism, and
wherein the controller is configured to select the tool mounted on the turret face through the tool holder by indexing the turret face with the motor controller and the turret turning motor based on the turret face number described in the machining program, and to control the machining with the tool and the driving mechanism based on the tool information by acquiring the tool information for use in machining set by the tool information setting device from the tool information setting device based on the turret face number, and to send the acquired tool information to the motor controller.

13. The system according to claim 1, wherein the tool information is position information of the tool.

14. The system according to claim 13, wherein the machine tool comprises the tool information setting device,
wherein a turret face number is designated to each of the plurality of turret faces provided on the circumference surface of the turret, and the motor controller turns the turret with the turret turning motor to select the predetermined tool by indexing a turret face of the plurality of turret faces based on the turret face number designated to the turret face mounted through the tool holder to machine a workpiece with the predetermined tool and the driving mechanism, and
wherein the controller is configured to select the tool mounted on the turret face through the tool holder by indexing the turret face with the motor controller and the turret turning motor based on the turret face number described in the machining program, and to control the machining with the tool and the driving mechanism based on the tool information by acquiring the tool information for use in machining set by the tool information setting device from the tool information setting device based on the turret face number, and to send the acquired tool information to the motor controller.

15. The system according to claim 1, wherein the machine tool comprises the tool information setting device,
wherein a turret face number is designated to each of the plurality of turret faces provided on the circumference surface of the turret, and the motor controller turns the turret with the turret turning motor to select the predetermined tool by indexing a turret face of the plurality of turret faces based on the turret face number designated to the turret face mounted through the tool holder to machine a workpiece with the predetermined tool and the driving mechanism, and
wherein the controller is configured to select the tool mounted on the turret face through the tool holder by indexing the turret face with the motor controller and the turret turning motor based on the turret face number described in the machining program, and to control the machining with the tool and the driving mechanism based on the tool information by acquiring the tool information for use in machining set by the tool information setting device from the tool information setting device based on the turret face number, and to send the acquired tool information to the motor controller.

* * * * *